(12) United States Patent
Matsuyama et al.

(10) Patent No.: US 6,582,299 B1
(45) Date of Patent: Jun. 24, 2003

(54) TARGET SHOOTING VIDEO GAME DEVICE, AND METHOD OF DISPLAYING RESULT OF TARGET SHOOTING VIDEO GAME

(75) Inventors: Shigenobu Matsuyama, Kobe (JP); Masaaki Kukino, Kakogawa (JP); Hitoshi Konishi, Akashi (JP); Yoshihisa Inoue, Kakogawa (JP); Shinichi Nakagawa, Kobe (JP); Koichi Nishio, Kobe (JP); Hirofumi Nagao, Kobe (JP)

(73) Assignee: Konami Corporation, Tokyo (JP)

( * ) Notice: Subject to any disclaimer, the term of this patent is extended or adjusted under 35 U.S.C. 154(b) by 0 days.

(21) Appl. No.: 09/937,975

(22) PCT Filed: Jan. 28, 2000

(86) PCT No.: PCT/JP00/00494

§ 371 (c)(1),
(2), (4) Date: Sep. 28, 2001

(87) PCT Pub. No.: WO01/54782

PCT Pub. Date: Aug. 2, 2001

(30) Foreign Application Priority Data

Dec. 17, 1998 (JP) .......................................... 10-376047

(51) Int. Cl.⁷ .............................................. A63F 13/04
(52) U.S. Cl. ............................................ 463/2; 463/31
(58) Field of Search .................. 463/1, 2, 5, 7, 463/30–34, 36–38, 49, 43, 52–54, 56; 273/148 B, 358; 434/16–23; 352/39, 95; 345/161, 163, 167

(56) References Cited

U.S. PATENT DOCUMENTS

| | | |
|---|---|---|
| 1,489,191 A | 4/1924 | Chester |
| 1,547,834 A | 7/1925 | Smookler |
| 2,111,952 A | 3/1938 | Tratsch |
| 3,191,588 A | 6/1965 | Thew |
| 3,515,114 A | 6/1970 | Carbonneau |
| 3,845,957 A | 11/1974 | Lohr et al. |
| 4,225,140 A | 9/1980 | D'Andrade et al. |
| 4,759,551 A | 7/1988 | Crompton |
| 4,910,646 A | 3/1990 | Kim |
| 5,224,860 A | * 7/1993 | Waldman et al. ............. 434/21 |
| 5,326,108 A | 7/1994 | Faith |
| 5,445,138 A | 8/1995 | Faith |
| 5,460,384 A | 10/1995 | Seidel et al. |
| 5,613,482 A | 3/1997 | Thai et al. |
| 5,669,607 A | 9/1997 | Silver et al. |
| 6,144,375 A | * 11/2000 | Jain et al. .................. 345/302 |

FOREIGN PATENT DOCUMENTS

| | | |
|---|---|---|
| JP | 01-291887 | 11/1989 |
| JP | 07-181934 | 7/1995 |

(List continued on next page.)

OTHER PUBLICATIONS

Descent II Tactics, http://www.weenie.com/descent/archive-.html, 2002, pp. 1–62.*
Descent II, http://www.3dgamers.com/games/descent2, 1997, pp. 1–2.*

(List continued on next page.)

*Primary Examiner*—Mark Sager
*Assistant Examiner*—Steven Ashburn
(74) *Attorney, Agent, or Firm*—Jordan and Hamburg LLP

(57) ABSTRACT

By making a game with greater richness in its feeling of realism, the level of (player) interest is increased. A game apparatus according to the present invention is equipped with image display means which displays on the screen of monitor a 3-dimensional game field image which includes enemy characters and display means for enlarged images which enlarges the image of the small area corresponding to the part of above-indicated image at which above-indicated model gun is pointed and displays it on liquid crystal unit of scope which is built onto model gun.

17 Claims, 14 Drawing Sheets

FOREIGN PATENT DOCUMENTS

| | | |
|---|---|---|
| JP | 08-299585 | 11/1996 |
| JP | 09-075552 | 3/1997 |
| JP | 9-140941 | 6/1997 |
| JP | 09192353 | 7/1997 |
| JP | 09-239151 | 9/1997 |
| JP | 9-271582 | 10/1997 |
| JP | 9-271583 | 10/1997 |
| JP | 10-230081 | 9/1998 |
| JP | 11-047432 | 2/1999 |
| JP | 11-047433 | 2/1999 |
| JP | 11-146977 | 6/1999 |
| JP | 00-233066 | 8/2000 |

OTHER PUBLICATIONS

Descent II, http://www.psxsoftware.com/prod02.html (Apr. 25, 1998), pp. 1–2.*

'Kollsman, Inc.—Fire Control Systems', <www.army-technology.com/–contractors/fire/kollsman>.*

'Syphon Filter' Instruction Manual, 989 Studios, Inc. (Feb. 1999).*

* cited by examiner

TARGET SHOOTING VIDEO GAME DEVICE, AND METHOD OF DISPLAYING RESULT OF TARGET SHOOTING VIDEO GAME

TECHNICAL FIELD

This invention relates to a shooting-type video game apparatus, in which one aims a model gun at an enemy character displayed on a monitor screen, and to a method for displaying shooting results of a shooting-type game such that the prescribed shooting results are displayed on the monitor screen.

BACKGROUND ART

A conventional shooting-type video game apparatus was disclosed in Japanese Unexamined Patent Publication No. Hei 10-230081. This apparatus comprises a monitor screen configured as a game scene by displaying on the monitor enemy characters which are targets in the game, and a model gun which has a trigger for simulated firing of bullets toward the screen. By pulling the imitation trigger, a display of the bullet traveling in the prescribed direction within the monitor screen appears, and if this bullet hits an enemy character, the display status of said enemy character will change—the character may be damaged within the game scene or may disappear from the game scene, etc.

However, in order to aim and shoot from long distances, actual snipers use guns with telescopic sights (scopes) and this sniping takes place under special circumstances—the shooter's hands may shake, he may receive "return fire" if he misses, etc. By giving no thought to these conditions, games lose any sense of realism and the player's level of interest drops.

DISCLOSURE OF THE INVENTION

This invention addresses the above problem and has as its objective provision of a shooting-type video game apparatus which raises the player's interest level by making the games richer in a sense of realism, and a method for displaying the shooting results of a shooting-type video game.

The invention is a shooting-type video game apparatus, in which one aims a model gun at enemy characters displayed on a monitor screen, characterized by provision of an image display means which displays on above-indicated monitor screen a 3-dimensional game field image which includes enemy characters, and a means for displaying enlarged images which enlarges the small area corresponding to the part within above-indicated image at which the model gun is aimed and displays it on a display device built onto above-indicated model gun.

According to this configuration, a three-dimensional game field image including enemy characters is displayed on the above-indicated monitor screen by a monitor means and, on a display device built into/onto the above-indicated model gun, an image of the small area corresponding to the part of the above-indicated graphic image at which the model gun is pointed is enlarged and displayed by a scope means. In this way, the game can be more full of realism and the level of interest even higher.

BEST MODE FOR CARRYING OUT THE INVENTION

Figure 1:
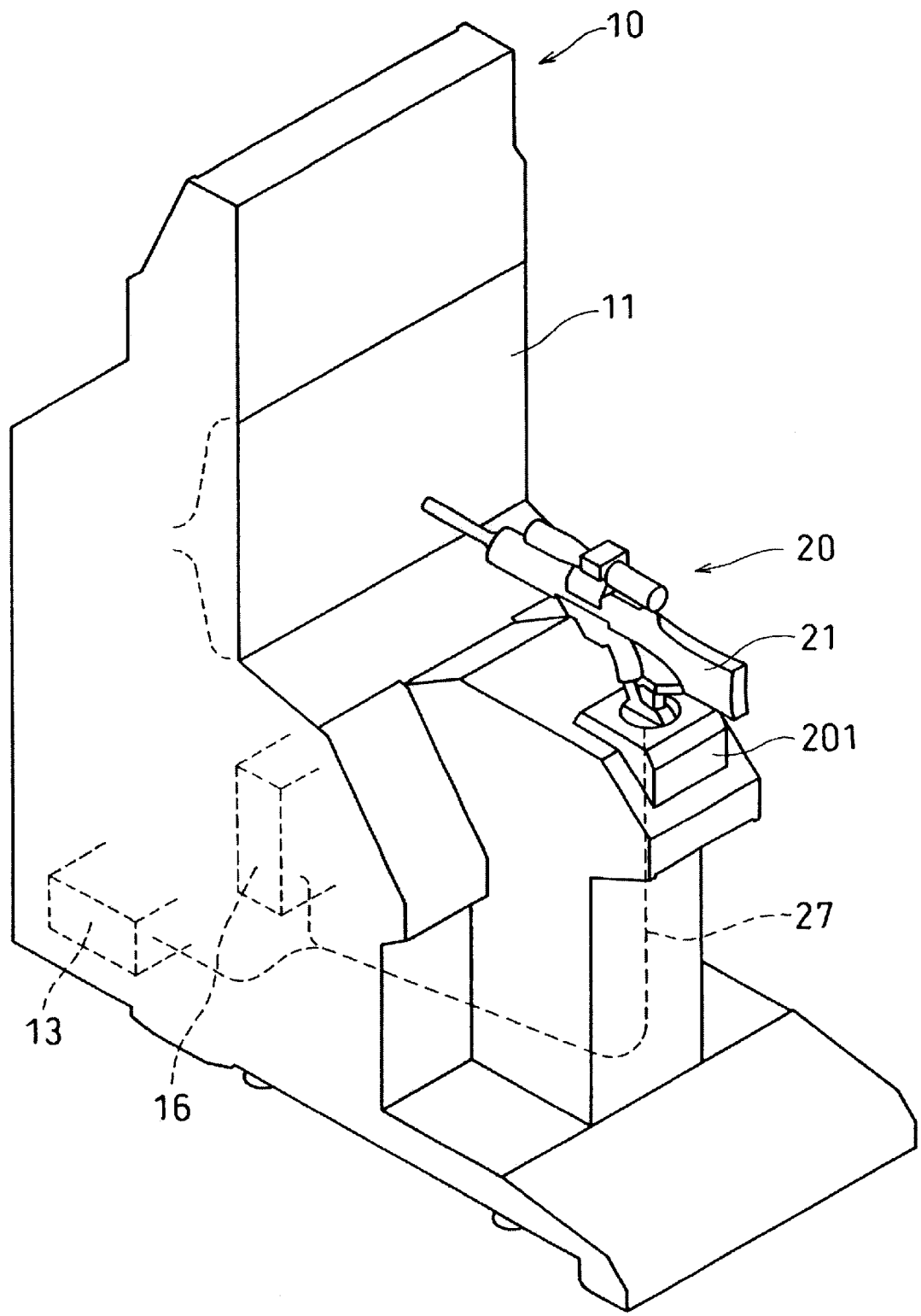
FIG. 1 is an perspective external view showing the basic configuration of the shooting-type video game apparatus related to one embodiment of the invention.
Figure 2A:
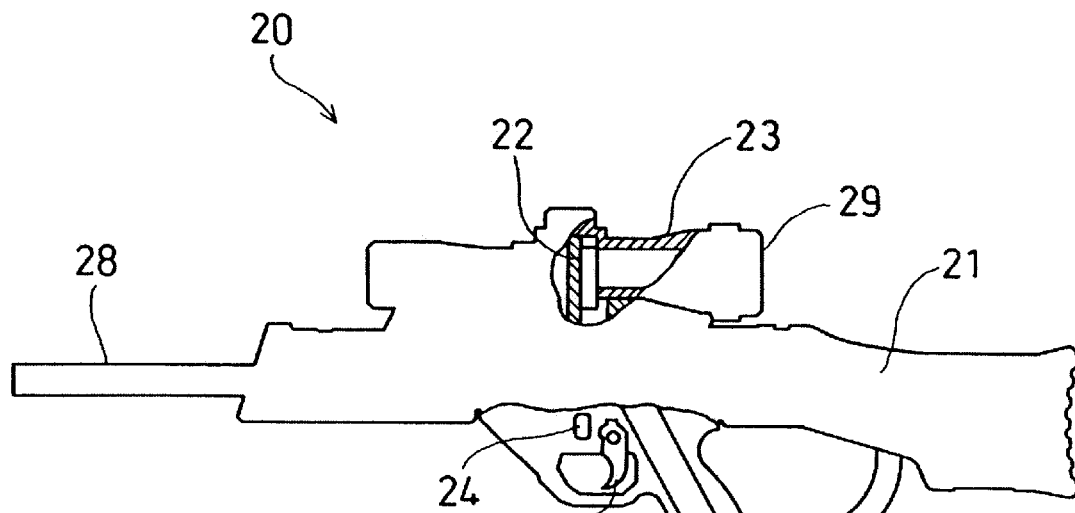
FIGS. 2A and 2B are a cross-sectional views showing the detailed construction of the model gun of the shooting-type video game apparatus.
Figure 2B:
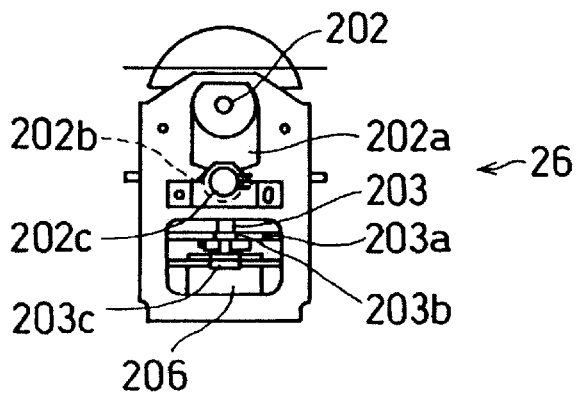

FIG. 1 shows the detailed configuration of a shooting-type video game apparatus according to this invention, while FIG. 2 shows the detailed configuration of a model gun. FIG. 2A is a partial cross-sectional side view, while FIG. 2B shows the part which is the angle-detecting means. As shown in FIG. 1, the shooting-type video game apparatus is comprised of game apparatus main body 10 and model gun 20.

Game apparatus main body 10 is equipped with monitor 11, such as a CRT, and control part 13 which, while progressing the game according to a pre-determined game program and the shooting results of the model gun 20, sends a graphic signal to above-indicated monitor 11. In addition, game apparatus main body 10 has a location-calculating part 16 which, upon simulated firing of a bullet from the muzzle of model gun 20, calculates the point at which the path of the bullet intersects the screen of monitor 11, so-called intersection point. Furthermore, although not shown in the figures, game apparatus main body 10 is equipped with a coin receiving slot and a start switch.

The height of model gun 20 is set at a position that is roughly the same height as the center of monitor 11. Also, a base part 201 is provided whose position in relation to game apparatus main body 10 is fixed at a prescribed distance from monitor 11, and gun main body 21 is affixed to base part 201 so that the gun can be swung (tilted) in the vertical direction and can also be rotated in a horizontal plane. In addition, as shown in FIG. 2A, on the top of gun main body 21, a tubular scope 23 is provided, which has a liquid crystal unit (LCD unit: serving as a display device) 22 built in, and the display face of the LCD unit 22 faces backward relative to the gun. On the underside of gun main body 21, a trigger 25, which can abut on micro-switch 24, is provided.

Specifically, the lowest part of gun main body 21 is affixed so that it can be swung freely around horizontal swing axis 202. This horizontal swing axis 202 moreover is mounted so that it can be rotated on vertical rotation axis 203. The allowable angle for above-indicated swinging (tilting) is limited by stoppers 204, and shock from (hitting) these limits is mitigated by shock-absorbing rubber 205. Also, as shown in FIG. 2B, small diameter gear 202b is engaged with fan-shaped gear 202a which is attached to horizontal swing axis 202, and on the rotational axis of this small gear 202b, rotating-type variable resistor 202c is attached as a sensor for angle of elevation. Concerning the above-indicated rotation, the angle of rotation is limited by shock-absorbing rubber not shown in the figure, and the axel of vertical rotation axis 203, around which rotation is done, is supported by bearing 206 of base part 201. Small diameter gear 203b is engaged with a gear attached to vertical axis 203, and on the rotational axis of this small gear 203b, rotating-type variable resistor 203c is attached as a sensor for angle of rotation. Thus the gun muzzle direction sensor 26 is configured to determine the angle at which the gun is pointed, based on the voltage values outputted from these two potentiometers 202c and 203c. Furthermore, instead of a variable resistor, an encoder or other potentiometer which can detect angles, etc. can be used.

Also, liquid crystal unit 22, micro-switch 24, and gun muzzle direction sensor 26 are each connected to the control part 13 and the intersection point location-calculating part 16 of game apparatus main body 10 by means of cable 27.

When trigger 25 of model gun 20 is pulled and, for example, micro-switch 24 goes to ON, a trigger signal, which is this ON signal, is sent to control part 13 via cable 27, and the arrangement is such that a bullet firing signal is generated within the control part 13 once each time trigger 22 is pulled or continuously for a certain number of firings (for example, 5) at specified intervals while the trigger is pulled. Also, on the front side of the liquid crystal unit 22 eyepiece 29 can be provided if needed.

Figure 3:
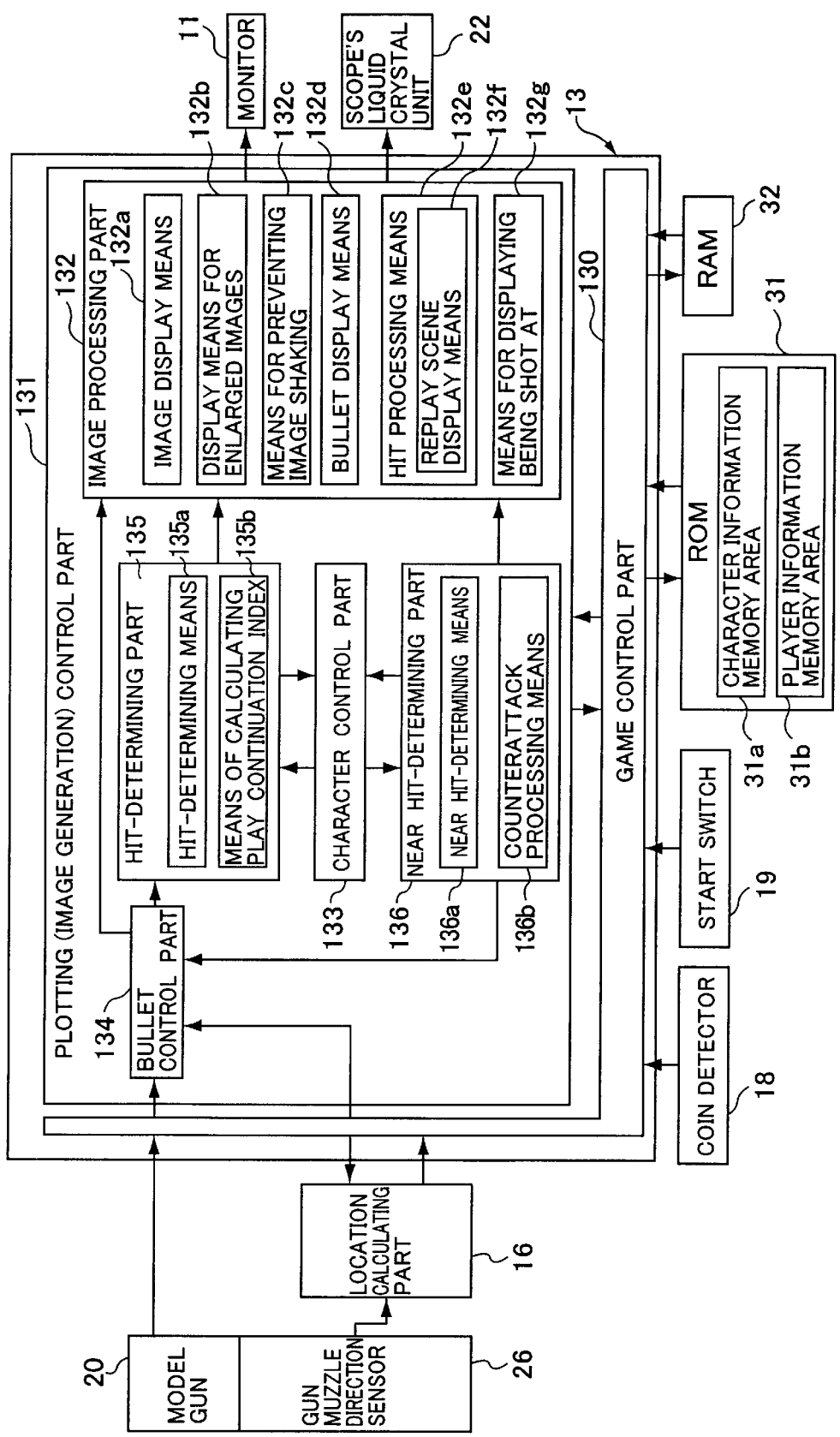
FIG. 3 is a block diagram showing the control system of the shooting-type video game apparatus.

FIG. 3 shows the control system for the above-indicated shooting-type video game apparatus. In this figure, the control system is composed of above-indicated control part 13, location-calculating part 16, coin detector 18, start switch 19, ROM 31, and RAM 32.

Control part 13 consists of a CPU, etc. and provides all the function processing parts of game control part 130 and image generation control part 131.

Game control part 130, based on a program stored in ROM 31, makes the changes to the game scene viewpoint location and performs the control actions for the entire game. In addition, game control part 130 determines [i] whether or not a coin has been put into the coin accepting slot, based on the presence or absence of a coin detection signal sent from coin detector part 18, and [ii] whether or not the game has been started, based on the presence or absence of a signal from start switch 19.

The following programs and data are stored in ROM 31: a game program for performing control of the entire game (transitioning of the game scene viewpoint location, movement of each game character, etc.); a screen image control program; coordinate data for the extremities (corners) of the polygons for displaying each game character on monitor 11 and liquid crystal unit 22 of scope 23; color data for textures; audio data for generating sound effects, such as shooting sounds, sounds of targets being hit, sounds of "near hits," etc.; and other data. RAM 32 provides temporary storage of data, etc. during processing.

Image-generation control part 131 provides the various functional parts: image processing part 132, game character control part 133, bullet control part 134, hit-determining part 135, and "near hit" determining part 136.

Image processing part 132 is for generating images of: stationary characters which are still (non-moving) enemies, buildings and other structures, etc.; moving characters which are game characters that move across the land, such as vehicles, etc.; flying characters which are game characters that move through the air, such as helicopters, airplanes, etc.; bullets which look like they have been fired from model gun 20; etc., and comprises image display means 132a, display means for enlarged images 132b, means for preventing image shaking 132c, bullet display means 132d, hit processing means 132e, replay scene display means 132f, and means for displaying the player's being shot 132g. This image processing part 132 performs specified processing based on image generation commands from game control part 130.

Image generation (plotting) commands are those for plotting solid-body type 3-dimensional images using polygons and those for plotting normal 2-dimensional images. Here, polygons are 2-dimensional polygonal images and in this embodiment of the invention, triangles and rectangles are used.

Image generation commands for plotting solid-body type images using polygons consist of the following data: polygon corner address data of ROM 31; texture address data for indicating the memory location in buffer memory for indicating the memory location in ROM 31 of color pallet data that shows the colors of the texture data; and brightness data for indicating the brightness level of textures.

Of these data, the polygon corner address data can be obtained by replacing the polygon corner coordinate data in 3-dimensional space with 2-dimensional polygon corner coordinate data found by coordinate conversion and "perspective projection" conversion, based on [i] data on the amount of transition (movement) of the scene itself (viewpoint) and [ii] data on amount of rotation. Image processing part 132 writes the texture data corresponding to the display area of RAM 32 which is shown by 3 or 4 address data for polygon corners.

Each of the above-indicated game characters is composed of a large number of polygons. Image processing part 132 stores in RAM 32 the coordinates of each polygon in 3-dimensional space. And, when game characters are moved on monitor 11 according to the specified program, the following kind of processing is performed. In other words, image processing part 132 converts the coordinates based on [i] the 3-dimensional coordinate data for the corners of each polygon which are stored in RAM 32 and [ii] data on the amount of transition (movement) of each polygon and data on amount of rotation, finding in succession the 3-dimensional coordinates of each polygon after movement and after rotation. Among the 3-dimensional coordinate data for each polygon found in this way, the coordinate data for the horizontal and vertical directions is converted to a "perspective projection" onto the hypothetical image surface. The 2-dimensional coordinate data obtained through this perspective projection conversion is used as the address data in the RAM 32 display area, that is, as the above-indicated polygon corner address data for display in 2dimensions. Image processing part 132 writes into the display area of RAM 32, which is shown by 3 or 4 address data for polygon corners, texture data shown by texture address data which is allocated ahead of time. In this way, game characters (stationary characters, moving characters, flying characters, etc.) which consist of a number of polygons with textures "painted" onto them are displayed on Monitor 11.

Image generation commands for plotting normal 2-dimensional images consist of the following data: polygon corner address data; texture address data; color pallet address data for indicating the memory location in ROM 31 of color pallet data that shows the colors of the texture data; and brightness data for indicating the brightness level of textures.

Character control part 133 reads out the various polygon corner coordinate data which makes up the stationary characters, moving characters and flying characters, the data on amount of movement, and the data on amount of rotation, all of which data is stored in ROM 31, and sends it to image processing part 132.

Based on these data, image display means 132a and display means for enlarged images 132b, (both part of image processing part 132) display the stationary characters, moving characters, and flying characters on monitor 11 and liquid crystal unity 22 of scope 23. Of these, display means for enlarged images 132b does not simply enlarge the image displayed on monitor 11, but creates an (enlarged) image using the polygons and textures stored in ROM 31. Thus, compared to the image of monitor 11, the enlarged image has finer resolution and, in addition, the enlarged image is shown on the liquid crystal unit 22 is made a brighter image, compared to that displayed on monitor 11. As a result, the player can readily distinguish game characters which are targets in the distance. However, when using this kind of enlarged scene, even minute movements (shaking) of the player's hand as he hold the model gun will be enlarged and his ratio of hitting targets will drop. To deal with this problem and to decrease the effect of hand movements of this kind, with the present invention a means for preventing image shaking 132c is provided. It establishes a "non-response zone," such that, as long as the distance between the position in the game field (which corresponds to the center of the enlarged image displayed in the liquid crystal unit 22 of scope 23) and that of the enemy character is within a specified range, small movements in the direction in which the model gun is pointed are not reflected in the enlarged image. Specifically, by increasing the closeness of the scale points of the actual "metering angle" within the virtual space, as one approaches the game character, the result is that, as one approaches that game character it becomes harder for the enlarged scene to move, while as one moves farther from the game character, it becomes easier for the enlarged scene to move. In addition, it would be acceptable to slow the speed at which the enlarged image follows changes in the game scene or to reduce the sensitivity of operation by adding an appropriate filter, etc. As a result, it would become easier to aim at the enemy character.

In addition, character control part 133 sends the above-indicated polygon corner coordinate data, data on the amount of movement, and data on amount of rotation to both hit-determining part 135 and near-hit determining part 136. Note that above-indicated stationary characters, moving characters and flying characters become the targets of the model gun 20.

Bullet control part 134 generates the specified number of shots (5, for example) at the specified intervals and reads the corner coordinate data stored in ROM 31 for the polygons which make up the bullet. The trajectory of bullets shot from model gun 20 is calculated ahead of time for each game scene (each frame), by trajectory simulation, based on data on the above-indicated intersect location of model gun 20, calculated by above-indicated position calculating part 16, the direction of bullet travel, which has been determined ahead of time according to the intersect location (for example, directional data corresponding to the intersect location may be stored in the memory in table format) and the bullet speed which has been set ahead of time (for example, Mach 3), and sends this bullet trajectory data to the image processing part 132, to hit-determining part 135, and to near-hit determining part 136. Bullet display means 132d of image processing part 132 performs the prescribed image processing and displays the bullets on the monitor for each game scene. Similarly it provides an enlarged display of the bullets in liquid crystal unit 22 of scope 23.

Each of the detection signals from gun muzzle direction sensor 26 is sent to position calculating part 16 via cable 27. This position calculating part 16 calculates the above-indicated intersect location based on the detection signals from above-indicated gun muzzle direction sensor 26 and sends those calculation results to control part 13. This calculation of intersect location is performed every time the game screen is rewritten [i.e. every "frame"] (for example, every $\frac{1}{30}^{th}$ of a second), regardless of whether a bullet has been fired or not. However, the arrangement is such that, when trigger 22 is pulled and a detection signal from micro-switch 24 is received, above-indicated intersect location data is fetched to control part 13 at each specified time unit (for example, each time the above-indicated bullet firing signal is outputted, that is, 10 times/second.), and the bullet is displayed on monitor 11.

In other words, the direction the above-indicated bullet travels in is established as a path going into the distance through the game image on monitor 11 along a line connecting above-indicated intersection location and gun position. For example, it is set up so that if the player points the gun muzzle at the center of monitor 11, the bullet will proceed straight from the intersect location in the center of monitor 11 (within the game scene and in a horizontal direction.) In contrast, if the intersect point is on the left side (right side) of monitor 11, the bullet will travel from the intersect point toward the left edge (right edge) of monitor 11. To make the trajectory of the bullet in monitor 11 even more realistic, it would be good to add a slight downward factor in the up/down direction component.

In an alternative method for finding the above-indicated intersect location, an "area sensor" positioned near the gun muzzle could be used to capture the image of a point light source (such as an LED, etc.) provided in a fixed position near the game screen and the location on the monitor screen at which the gun muzzle is pointing could be calculated from the position of the captured image of the light source within the image area. Alternatively, a light-sensing element, such as a photodiode, could be positioned on the model gun and, by pulling the trigger, the monitor screen could be made to go white by displaying the luminescence line of the monitor. The above-indicated light-sensing element would receive the light of the raster scan of that white screen and the time lag between the start of the raster scan and the sensing of the light could be found. Such methods would be especially effective in cases where the gun in not mounted to the game main body in a fixed manner.

With this embodiment of the invention, during the time that trigger 22 is pulled, a specified number of bullets is fired in succession at specified time intervals. As a result, several bullets will be displayed. In addition, trajectory simulation is performed for each bullet, each time the game scene is re-written [i.e. for each frame], so it is possible to identify in advance, bullets which will hit characters and those which will be near hits.

Hit-determining means 135a of hit-determining part 135 determines whether or not above-indicated stationary characters, moving characters, or flying characters intersect with the trajectory of any of the above-indicated bullets, in other words, whether or not each bullet hits a stationary character, moving character, or flying character. In other words, hit determination is done by calculating whether there is an intersection between the 3-dimensional coordinates of any of the surfaces of all the polygons in the scene and the data of the bullet trajectories. Then, when it is determined that there is an intersection, the intersect signal for that bullet is sent to image processing part 132. In that way, image processing part 132, displays on monitor 11 and liquid crystal unit 22 appropriate evidence of the successful shot, such as the game character being knocked backward and falling to the ground, based on polygon corner coordinate data read from ROM 31 by character control part 133. Meanwhile, character control part 133, based on polygon corner coordinate data read from ROM 31, makes the game character who was hit by the bullet stay lying on ground or eliminates from the game scene.

In other words, in response to a bullet hitting any game character, the results of the shot are shown by changing the game scene display after the hit, compared to what it was before. The processing to accomplish this is done by hit processing means 132e. Also, a replay of the scene of the moment that a game character is hit is displayed on monitor 11, for example in a small image area in the upper left hand corner (Refer to FIG. 12.). To enable this replay display, a replay scene display means 132f is provided in above-indicated processing means 132e.

Furthermore, in determining a hit by means of hit-determining part 135, the trajectory of each bullet in each game frame is sent from bullet control part 134 to hit-determining part 135. In response to this, character position data for each game character in each game scene is sent from character control part 133 to hit-determining part 135. In each game frame, for each bullet, hit-determining part 135 determines ahead of time whether there is an intersection between the bullet trajectory and an enemy character. In cases where hit-determining part 135 determines there is an intersection, it sends an intersect signal to image processing part 132 at the time of the game frame wherein the trajectory and enemy character intersect, or at the time of the game frame wherein the trajectory comes the nearest to the enemy character. In the case of moving characters and flying characters this applies to those bullets that have a trajectory which has been previously determined to result in an intersection, while, in the case of stationary characters, this applies all bullets in a burst. Hit processing means 132e of image processing part 132, receiving that intersect signal, displays the above-indicated shooting results in the case that the bullet has it an enemy character. In addition, ROM 31 has a game character information memory means 31a and a player information memory means 31b. Game character information memory means 31a has stored ahead of time role data, such as whether a game character is a "boss" or an underling and data on enemy body parts, such as limbs (arms and legs), head, etc., and the above-indicated shooting results may change depending on this game character information. For example, there may be criteria such as: a weak character can be knocked down with one hit, but in the case of a boss character, he cannot be knocked down simply by one hit to the limbs, but must be hit many times there, while in the case of a hit to the head he can be knocked down with one hit, and other such criteria. Player information memory means 31b stores in memory player information which is an index which enables that player's play to continue. Above-indicated hit-determining means 135 is equipped with means of calculating play continuation index 135b which reduces this index by a specified amount for each act of sniping and for each time the player is hit by returned fire.

In addition, near-hit determining means 136a of near-hit determining part 136, in the case that hit-determining means 135a of hit-determining part 135 determines that there is no intersection (i.e. no hit was made), determines whether or not the trajectory of each bullet has passed near a game character. It does this by determining whether there is an intersection between above-indicated bullet trajectory and any spatial location within a specified range surrounding the perimeter of above-indicated character. (It would also be acceptable to consider only spatial locations on the side to which the bullet is flying in.) Note that this near-hit determining part 136 performs this determination by comparing trajectory data for above-indicated bullet and location data. It calculates this location data (for the prescribed space within above-indicated specified range) based on above-indicated enemy character position data.

Then, when a determination of "near hit" is made, a "near hit" signal is sent to return fire processing means 136b and also to image processing part 132. As a result, image display means 132a and enlarged image display means 132b of image processing part 132, based on the polygon corner coordinate data which character control part 133 reads from ROM 31, the actions of the enemy character when he recognizes a sniper attack (such as turning toward the direction of the incoming fire) and when he transitions to firing back are displayed in monitor 11 and liquid crystal unit 22 of scope 23. (Refer to FIG. 8.) If a number of shots, specified ahead of time, pass near the same game character as a series of shots and accordingly the "near hit" signal is sent as a series, then, in response, a character scene of a character falling to the ground, or a flying character receiving partial damage, such as having its wings simulatedly ripped off, or a flying character in a spinning dive, crashing to the earth, may be shown. Similarly, in response to a series of near-hit signals being sent in, one could have the color of a flying character change through various shades or the shape of a flying character gradually.

Also, if within one period of pulling the trigger, the same flying target incurs only one near-hit and not a series of them, the game character which received damage may be restored to its original pre-damage condition.

In other words, in response to a "near hit" of a flying target by a bullet, the shooting results are displayed by changing the game scene after the near-hit of a game character by a bullet, relative to what it was before.

Moreover, in order for near-hit determining part 136 to make hit determinations, bullet control part 134 sends to near-hit determining part 136 data on the trajectory of each bullet in each game frame. Correspondingly, flying character position data for each game frame is sent from character control part 133 to near-hit determining part 136. Near-hit determining part 136 determines ahead of time for each bullet and in each game frame whether or not there will be a near-hit between the bullet and a flying character. When it makes a determination that there will be (one or more) near-hits, it sends a near-hit signal, regarding the bullet which will first make a near hit, to image processing part 132 for the game frame in which the bullet nearly hits the flying character or the game frame in which the bullet is closest to the moment of the near hit of the flying character. Hit processing means 132e of image processing part 132, receiving this near-hit signal, causes the above-indicated shooting result for the case of a bullet nearly hitting a flying character to be displayed.

In addition, when the above-indicated near-hit signal is sent to counterattack processing means 136b of above-indicated near-hit determining part 136, the enemy character turns to counterattacking and performs the action of shooting bullets toward the player who is outside the screen. At this time determination of whether the bullets shot by the enemy character hit the player, is done by hit-determining means 135a of hit-determining part 135. The hit-determination method in this case is similar to the above-indicated case where the player is sniping at the enemy character. And, when it is determined that there has been a hit, a display of "being hit" is provided by means for displaying (the player's) being shot 132g, of image processing part 132. (Refer to FIGS. 9 and 10.) For this "being hit" display, for example, the screen color can be changed or other effects done, but in the figures, for convenience sake, a cross-hatching pattern has been added. In addition, when a player is hit, his "life value" which is his game continuation index is decreased. Moreover, when a player is hit through the counterattack (return fire) of the enemy character, to make it seem really as though the sniper is collapsing, the scene may be made to shake.

Next, the operation of the above-indicated shooting-type video game will be described while referring to the flow charts of FIGS. 4 through 6.

Figure 4:
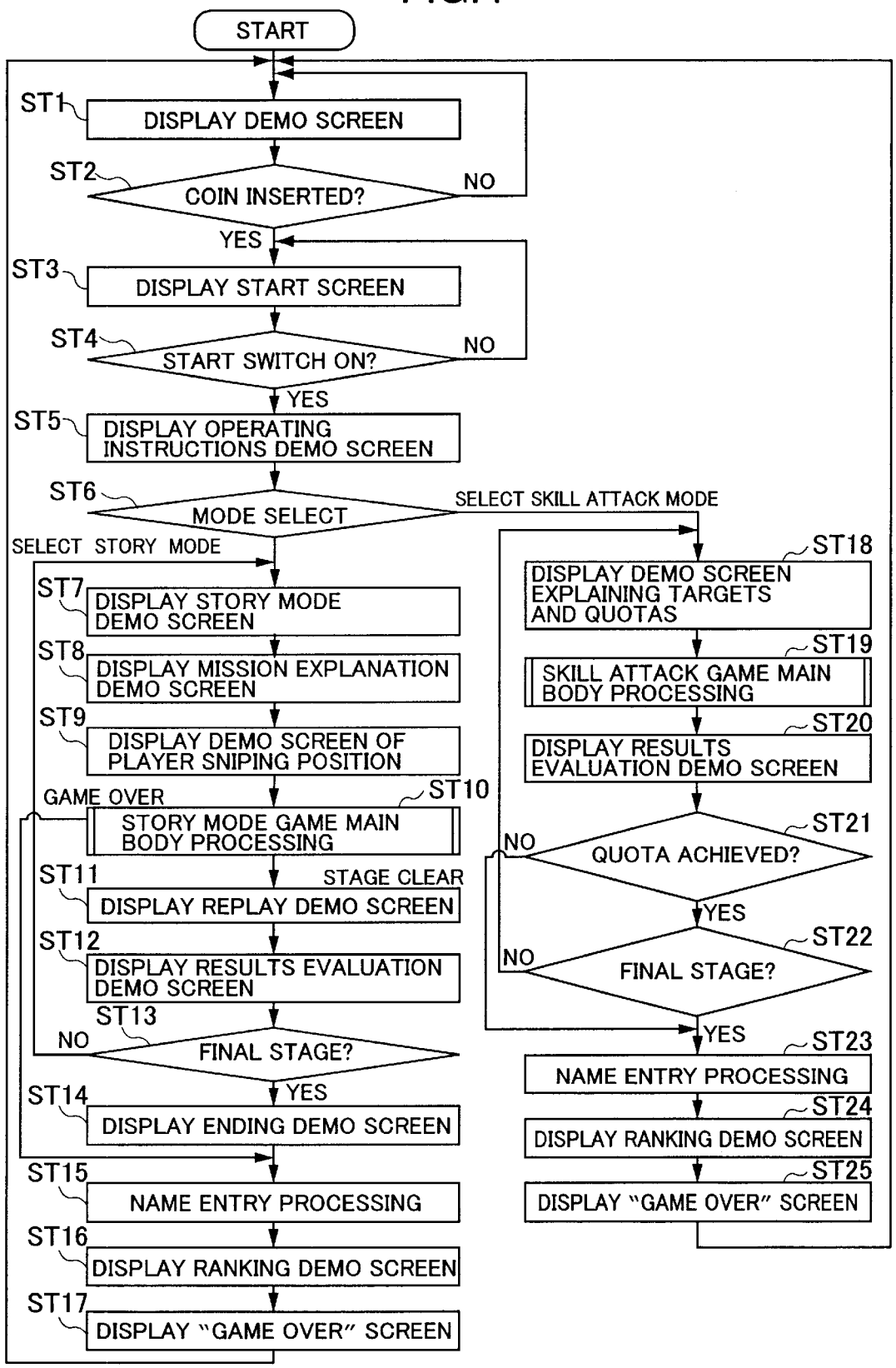
FIG. 4 is a flowchart describing operation of the shooting-type video game apparatus.
Figure 5:
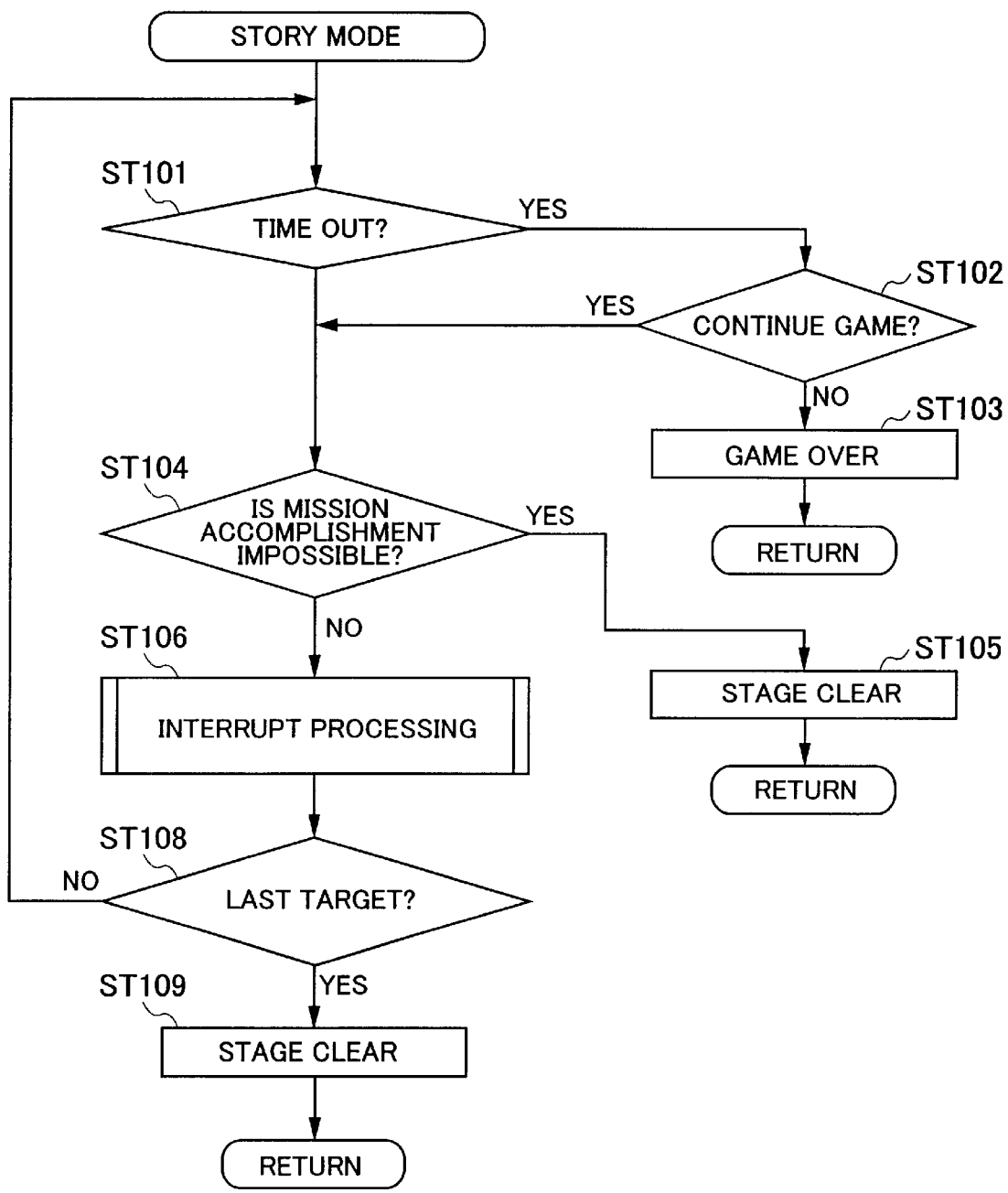
FIG. 5 is a flowchart describing operation of the shooting-type video game apparatus.

In FIG. 4, when power is turned on, a demonstration screen is displayed on monitor 11 by image processing part 132 (step ST1). The content of this demo screen contains a warning, title, game, story, ranking, etc. Next, it is determined whether or not a coin has been inserted in the coin slot (step ST2.) If a coin has not been inserted (i.e. NO in ST2), display of the demo screen of step ST1 will be continued. When a coin is inserted (YES in ST2), the start screen will be displayed by image processing part 132 (step ST3).

Next, it is determined whether or not start switch 19 has been pushed or not (step ST4). If start switch 19 has not been pushed (NO in step ST4), display of the start screen of step ST3 will continue, while if start switch 19 is pushed (YES in step ST4), the game will start.

Figure 7:
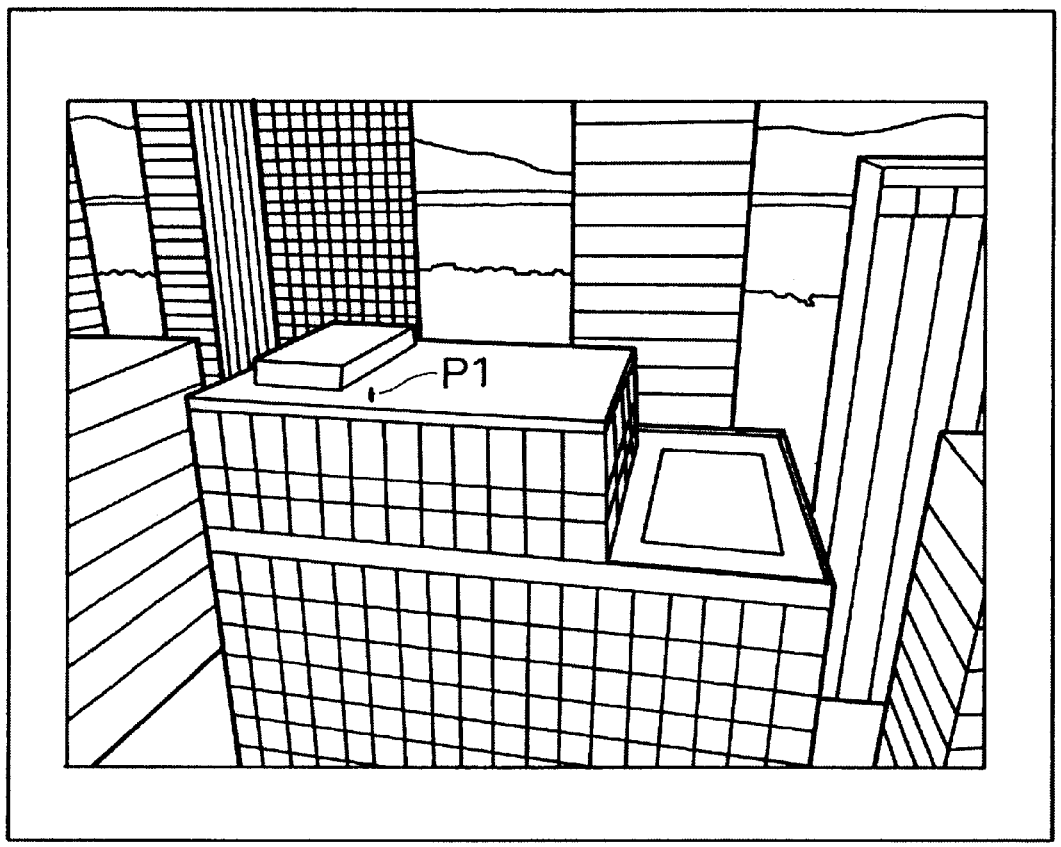
FIG. 7 is a diagram showing one example of the game screen of the shooting-type video game apparatus.
Figure 8:
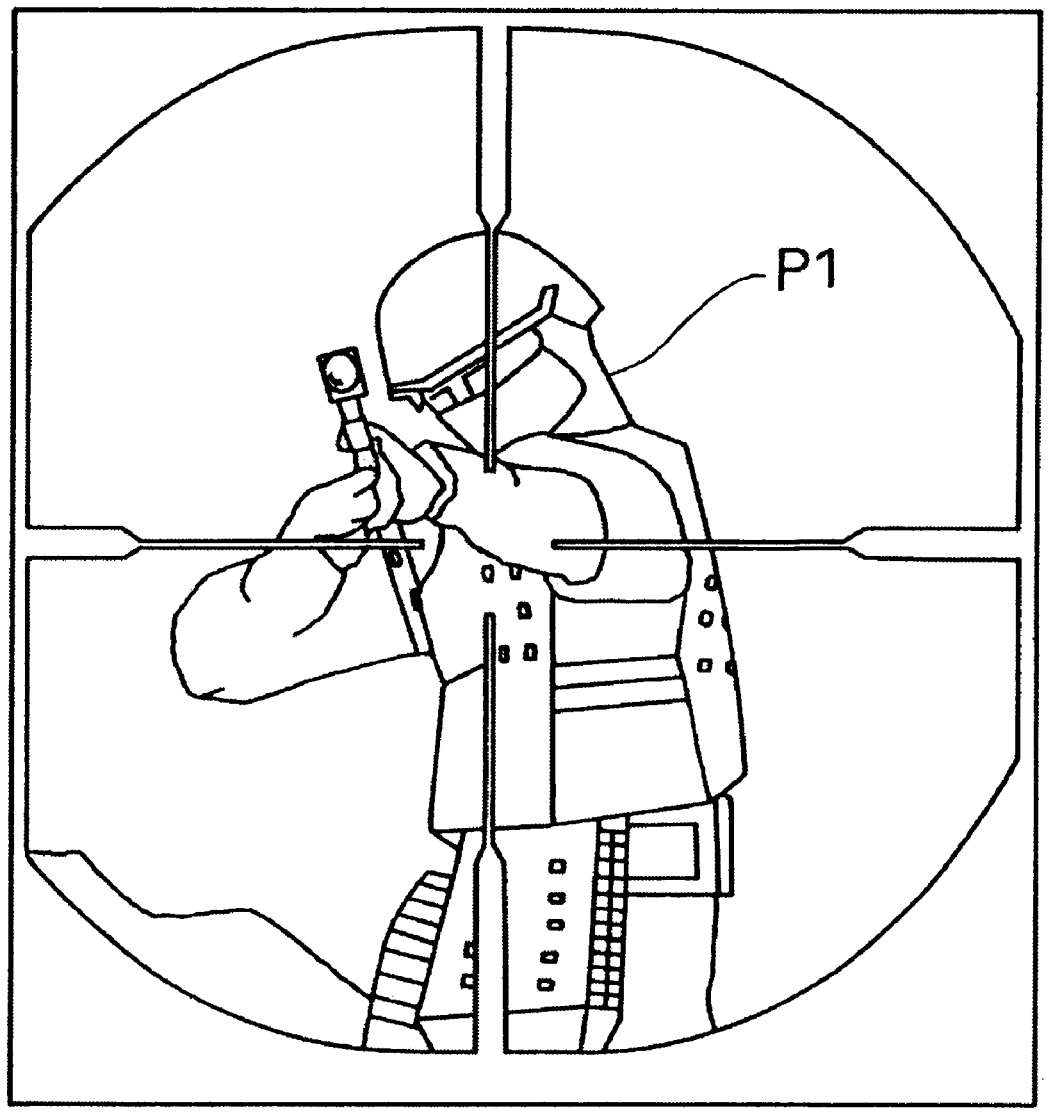
FIG. 8 is a diagram showing one example of the game screen of the shooting-type video game apparatus.

Then, when the game starts, game scenes—as shown in FIG. 7 and FIG. 8, for example—will be displayed on monitor 11 and the liquid crystal unit 22 of scope 23.

FIG. 7 is the situation of enemy character P1 lurking on the roof of a skyscraper as displayed on monitor 11. In this scene, because the distance between model gun 20 and enemy character P1 (the calculated distance based on game space) is quite far, it is just possible to determine whether or not enemy character P1 is there. In contrast, FIG. 8 is an enlarged view of the same character P1 as displayed on the liquid crystal unit 22 of scope 23, and in this enlarged view, the fact that the same character P1 is aiming this way with a gun can be readily verified.

Next will be explained the processing that takes place after the start of the game. In other words, if in step ST4 of FIG. 4, start switch 19 is pushed, a demo screen explaining operation is displayed, and the user is asked to make a mode selection and choose either story mode or skill attack mode (step ST5). Here, story mode is the normal mode which can be enjoyed by beginners, etc., while skill attack mode is a mode requiring high skill level. Moreover, it is obvious that an intermediate mode could also be offered. Also, it is possible to skip this step ST5.

Mode select is done by the player's making a selection (step ST6) and if, for example, story mode is selected, a story mode demo screen will appear (step ST7). Its content is an opening, etc. This step 7 may be skipped. Continuing, a demo screen explaining the mission assigned to the player appears (step ST8), and (in step ST9) a demo screen of the sniper having arrived at his sniping position is displayed. This step ST9 can be skipped. Then the main processing of the story mode game begins (step ST10).

Next will be described main processing of the story mode game. In other words, when the story mode game main processing begins, a time count starts, as shown in FIG. 5, by comparing to a pre-set time, it is determined whether or not the game has reached its time limit (step ST101). Here, if it is determined that the time limit has been reached (YES in step ST101), the player will be asked whether or not he wants to continue to play the game (step ST102). Then, if he does not want to continue the game (NO in step ST102), it will go to "game over" (step ST103) and the display will return to the demo screen of above-indicated step ST1. On the other hand, if he desires to continue the game (YES in step ST102), he will be asked whether it is possible to accomplish the mission or not (step ST104). And, if for some reason, such as not being able to find the enemy characters, it is impossible to accomplish the mission (YES in step ST104), it will go to "stage clear" (step ST105) and the display will return to the demo screen of above-indicated step ST1. This "stage clear" has an effect on the adjusting calculation of evaluation (score) and time. On the other hand, if mission accomplishment is not impossible, (NO in step ST104), interrupt processing is begun (step ST106).

Figure 6:
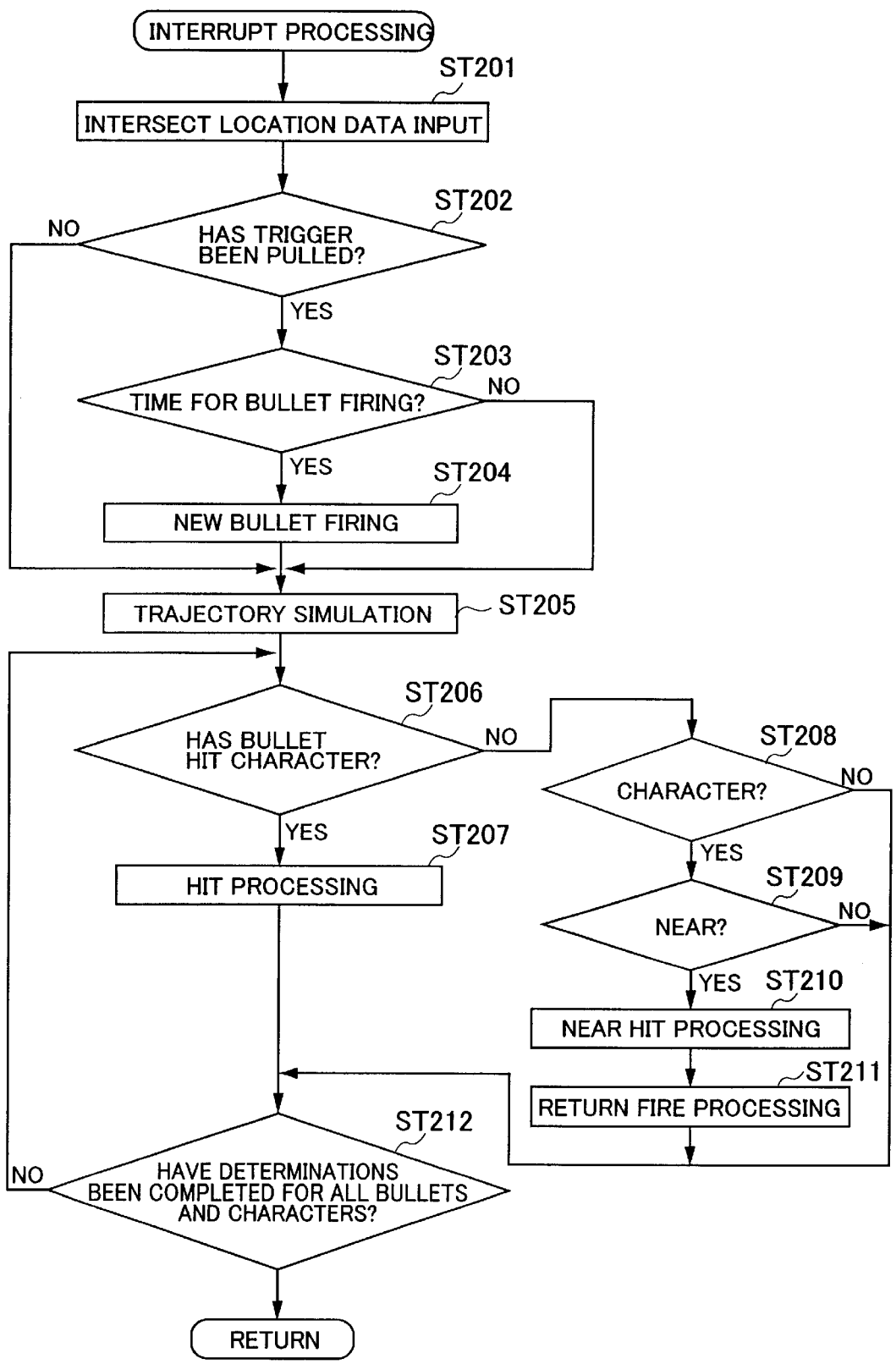
FIG. 6 is a flowchart describing operation the shooting-type video game apparatus.

That is, if interrupt permission is granted, as shown in FIG. 6, intersect location data calculated by intersect location calculating part 16 is inputted to bullet control part 134 (step ST201) and next it is determined whether tripper 25 of model gun 20 is being pulled or not (step ST202). If trigger 25 is being pulled (YES in step ST202), it is determined by game control part 130 whether it is the time for a bullet to be shot or not (step ST203). If it is determined that it is the time for a bullet to be shot (YES in step ST203), a new bullet will be shot out (step ST204).

Figure 11:
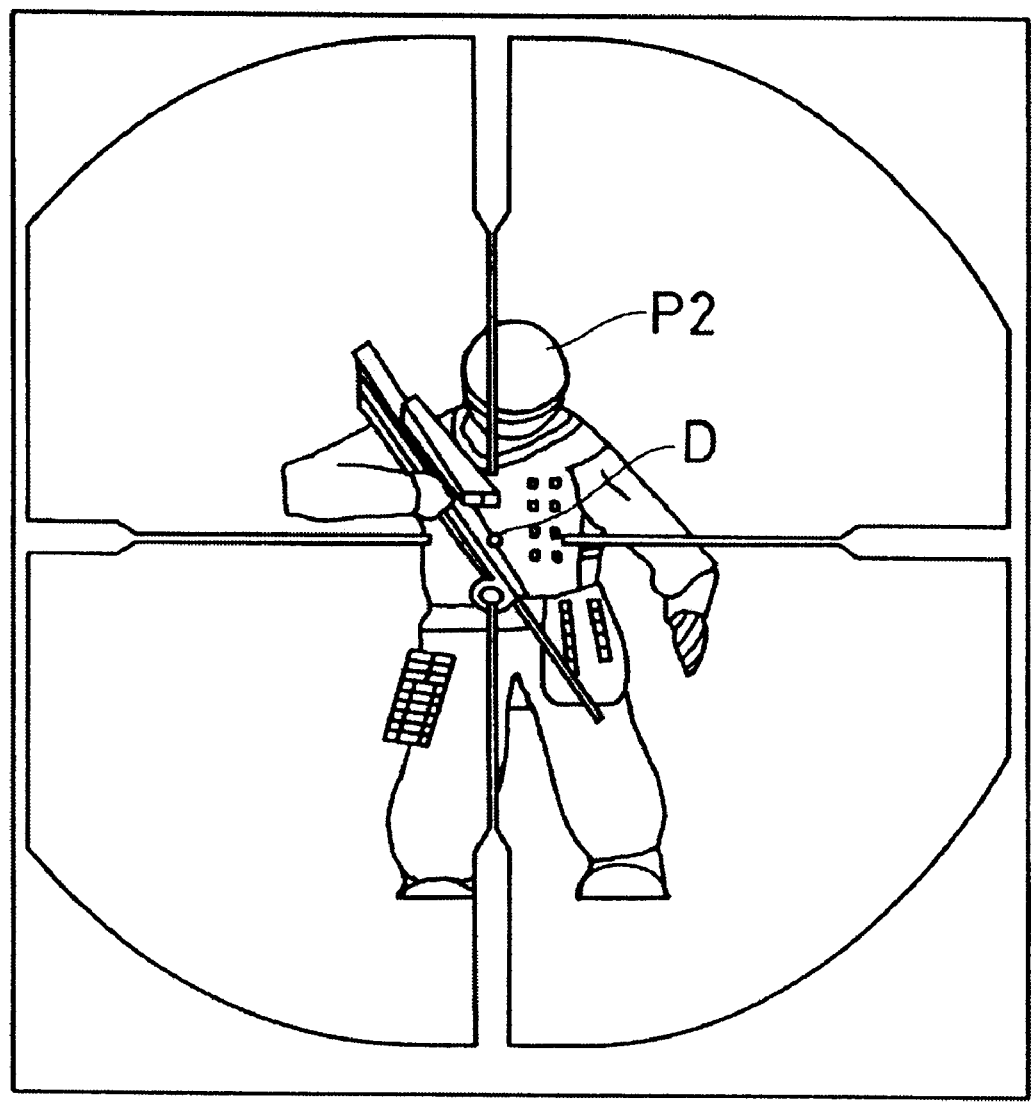
FIG. 11 is a diagram showing one example of the game screen of the shooting-type video game apparatus.

The next step is to calculate the trajectory, through each game frame (each frame on monitor 11 and on liquid crystal unit 22 of scope 23) of the bullet which has been shot out (step ST205). Moreover, because in each game frame, bullets which were just shot exist, the trajectory for each bullet in each game frame must be calculated ahead of time. Also, it must be determined for each bullet whether or not it has directly contacted (hit) a character, for example, as shown in FIG. 11, and this must be done, sequentially, for each game character (including fixed characters, moving characters, and flying characters) (step ST206). In the case of a hit (YES in step 206), hit processing is done for the bullet which made the hit (step ST207).

This hit processing (for example, in the case that an enemy character which is a fixed character is hit by a bullet) consists of game character control part 133 reading out from ROM 31 the polygon corner coordinate data, etc. for displaying the situation of the enemy being knocked backward and falling down. Similarly, in the case of a bullet hitting an airplane (i.e. a flying character), as shown in FIG. 15, the processing consists of game character control part 133 reading out from ROM 31 the polygon corner coordinate data, etc. for displaying the situation of the airplane crashing. In the case of a bullet hitting a vehicle (i.e. moving character), the processing consists of game character control part 133 reading out from ROM 31 the polygon corner coordinate data, etc. for displaying the situation of the vehicle being destroyed. In addition, this hit processing include processing for reading audio data, such as sound effects corresponding to a bullet hitting the game character, from ROM 31 and reading image data for displaying scores on the monitor screen, also from ROM 31. Moreover, it may be arranged that when a game character who is a civilian (not an enemy) is hit by a bullet, it affects the adjusting calculation of evaluation (score) and time.

When a bullet has not hit a game character (NO in step 206), it is further determined whether the game character which was determined not to have been hit is an enemy character or not (step ST208). Moreover, in the figure, the question "Character?" in this step means "Enemy character?" In case it is an enemy character (YES in step ST208), it is further determined whether the bullet is in a position near the enemy character (a spatial position within a specified range surrounding the perimeter of that character) or not (step ST209). If the bullet is in a position near an enemy character (YES in step 209), near-hit processing is for the bullet which came near the character (step 210).

Figure 9:
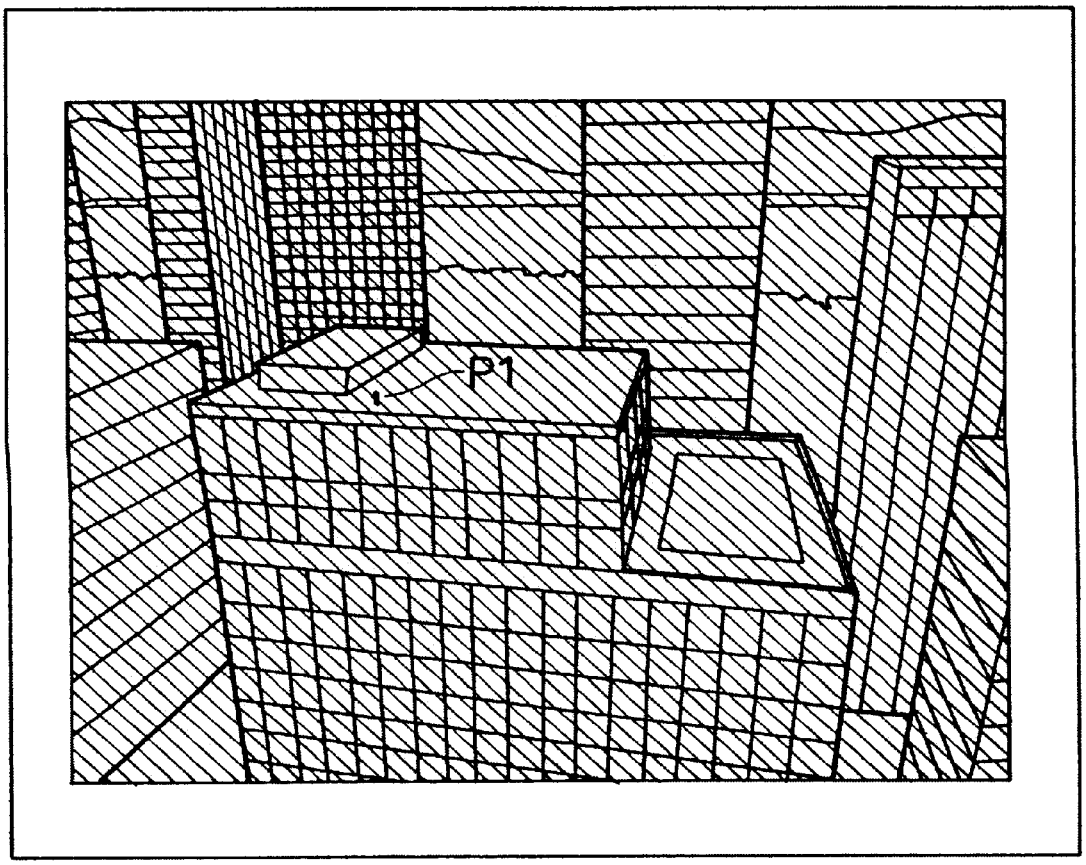
FIG. 9 is a diagram showing one example of the game screen of the shooting-type video game apparatus.
Figure 10:
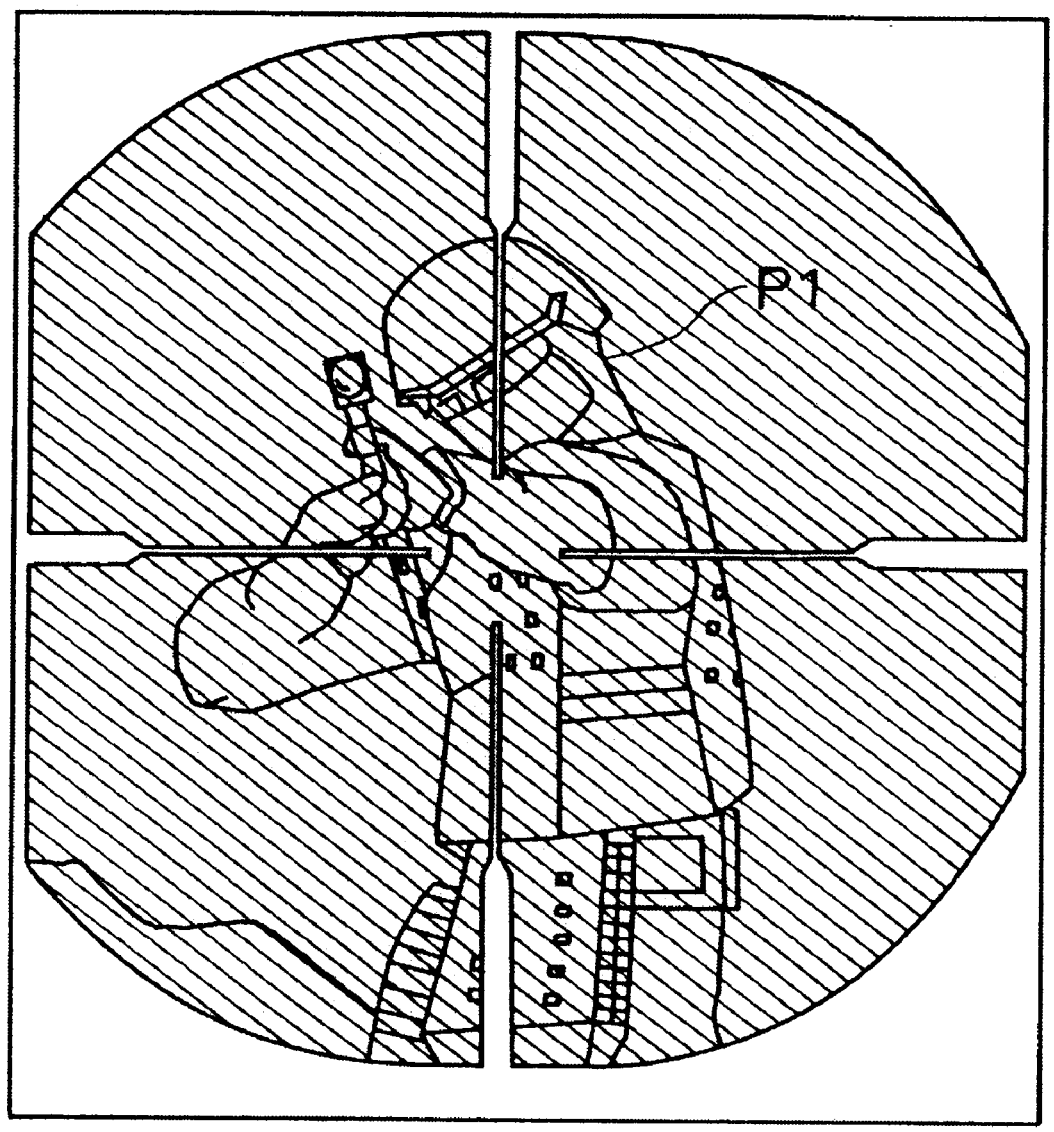
FIG. 10 is a diagram showing one example of the game screen of the shooting-type video game apparatus.

This near-hit processing consists of character control part 133 reading out from ROM 31 coordinate data for polygon corners to display, for example, an image of the enemy character recognizing that it is being shot at, due to the bullet passing near that character. Through near-hit processing, counterattack processing is done whereby the enemy character, recognizing that it is being shot at, counterattacks (step ST211). The content of the counterattack processing is that the enemy character shoots at the player and the player will be hit with a specified percentage of those shots. Here will be explained FIGS. 7–15. FIG. 7 is a display (in monitor 11) of the appearance of being counterattacked by enemy character P1. FIG. 8 is an enlarged image of this part—i.e. the scene as shown in liquid crystal unit 22 of scope 23. In the figure, within the circular screen a cross mark cross hairs is/are shown, and this type of screen indicates that this is the screen of liquid crystal unit 22 of scope 23 similarly, below. In this way, enemy character P1 who is difficult to distinguish in monitor 11 can be easily recognized by means of scope 23. FIGS. 9 and 10 show scenes of the instant that a bullet shot by enemy character P1 strikes the player. As explained above, the hatch marks in those figures indicate that they are such situations. FIG. 11 is a scene of the moment that bullet D strikes enemy character P2. In the central cross hairs in the figure, bullet D can be seen flying toward the enemy character P12.

Figure 12:
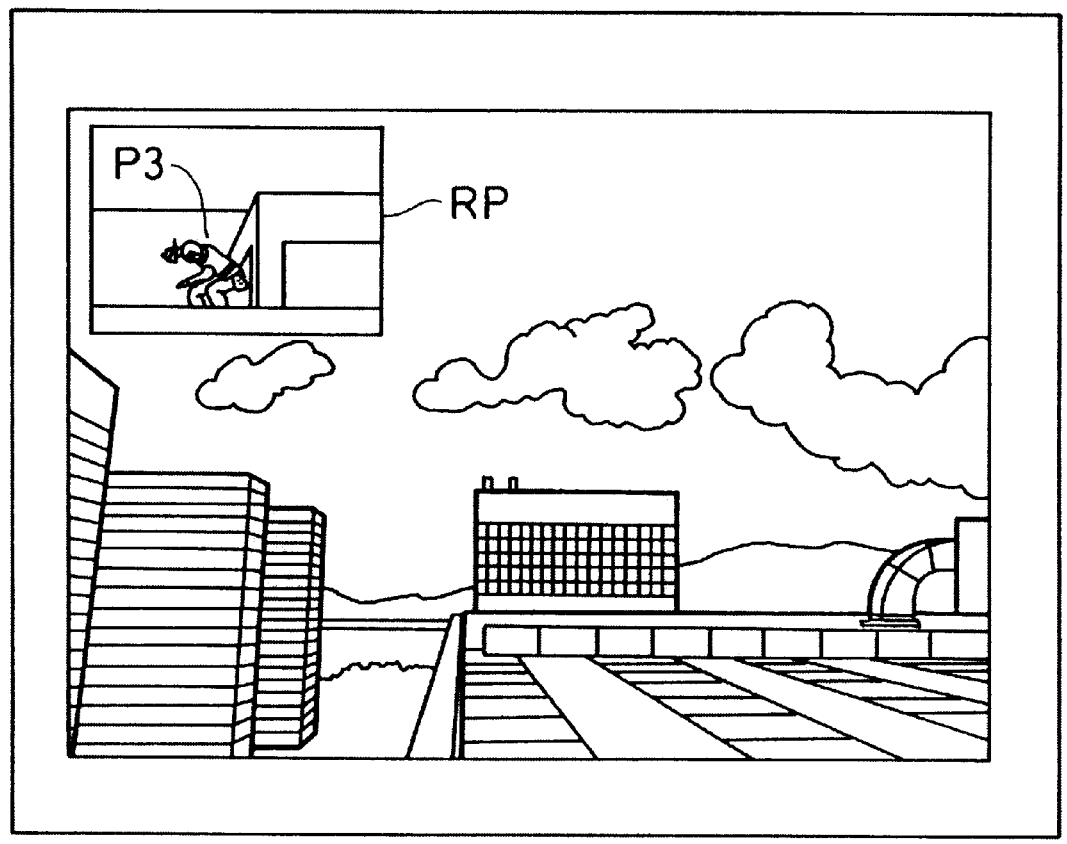
FIG. 12 is a diagram showing one example of the game screen of the shooting-type video game apparatus.
Figure 13:
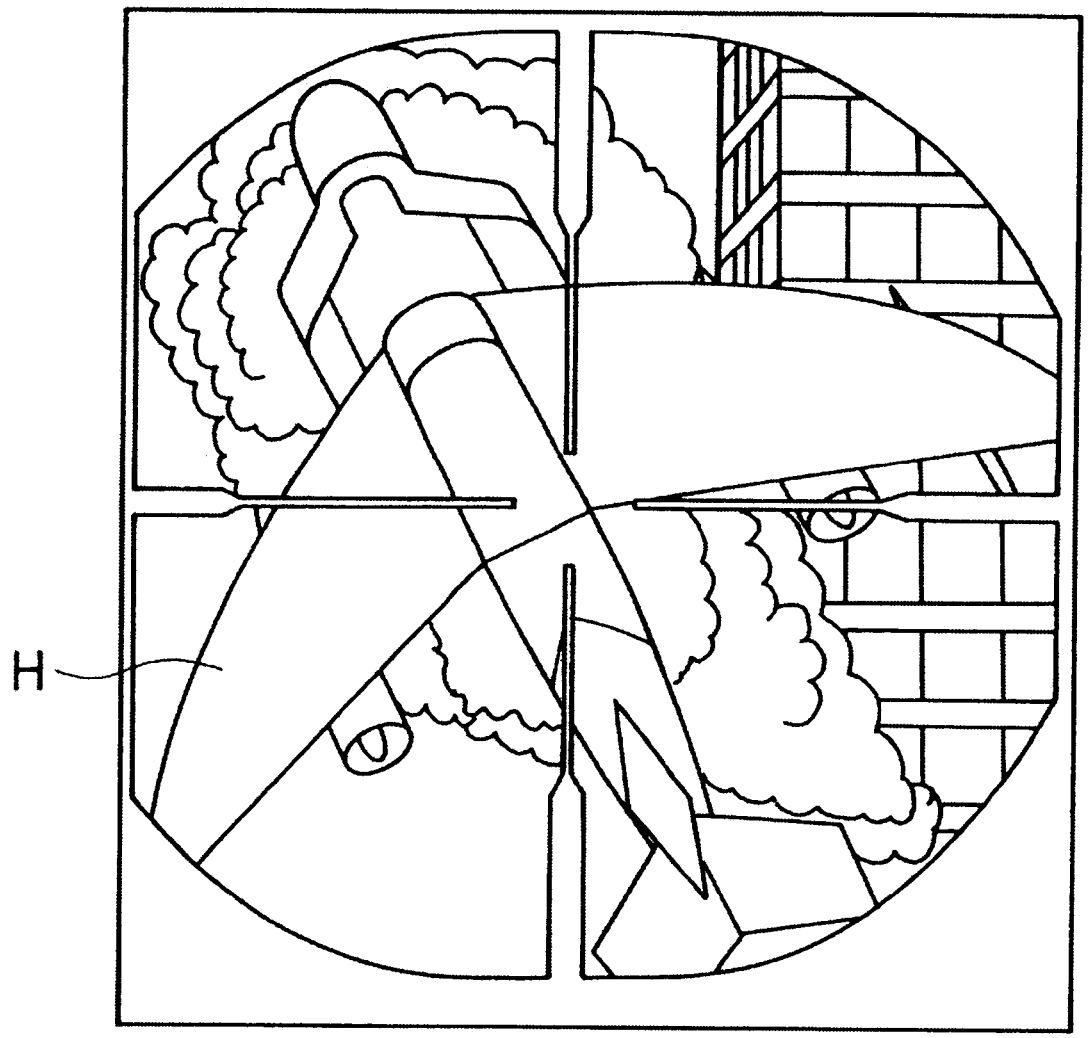
FIG. 13 is a diagram showing one example of the game screen of the shooting-type video game apparatus.
Figure 14:
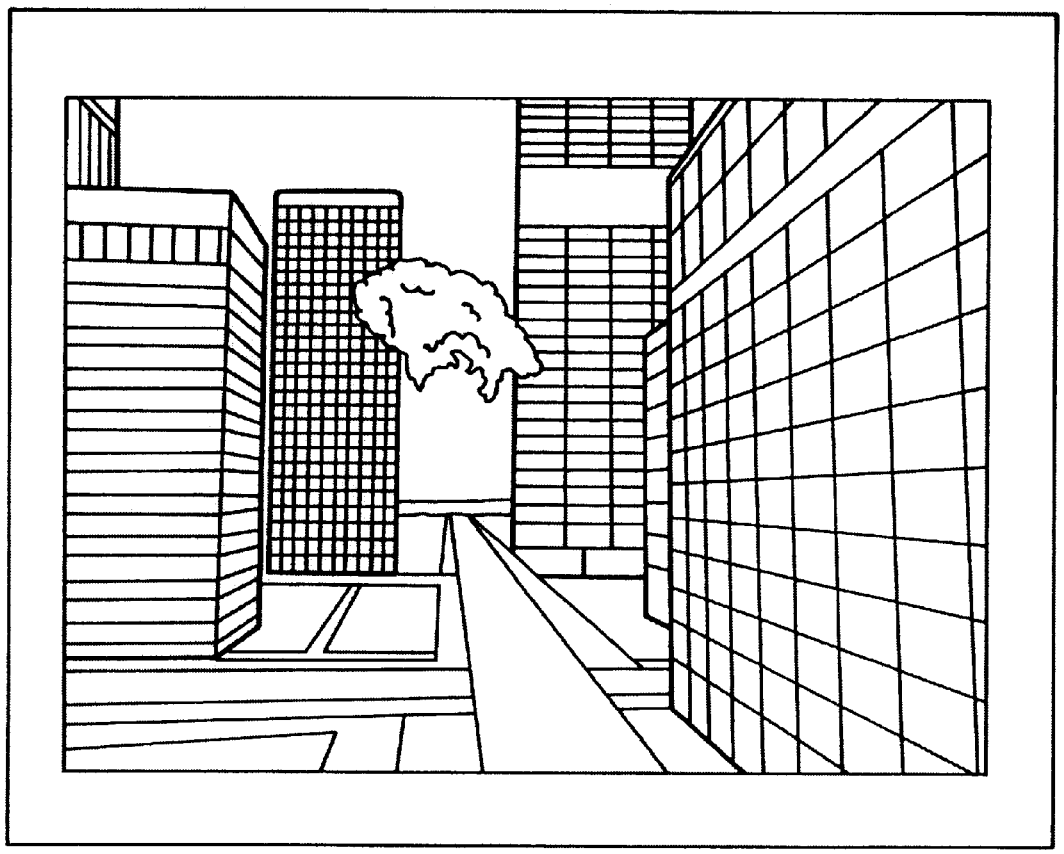
FIG. 14 is a diagram showing one example of the game screen of the shooting-type video game apparatus.

FIG. 12 is a scene of the moment when a bullet hits enemy character P3. Simultaneously with determination that the enemy has been hit, a small screen for showing a replay appears in the upper left part of the screen. In this way the player can confirm the moment of the hit and others watching will also avoid missing it. FIG. 13 shows a scene from the viewpoint of the player when he is aiming at flying character H. FIG. 14 shows a scene of the successful result of a shooting attack on above-indicated flying character H.

Also, after the hit processing of step ST207 is performed and after the return fire processing of step ST211 is performed and after it has been determined in step ST208 that this is not an enemy character, and also after it has been determined in step ST209 that this is not a near hit, it is determined by game control part 130 whether all determinations for all bullets and all characters have been completed (step ST212). If these have not been completed (NO in step ST212), the flow returns to step ST206 and the above-indicated determinations and processing are repeated. When all determinations have been completed (YES in step ST212), flow returns to the flow chart shown in FIG. 5.

The interrupt processing, etc. of above steps ST101 to 106 is repeated until the final target is reached (step ST108). Then, if it is the final target (YES in step ST108), it goes to "stage clear" (step ST109) and returns to the flow chart of FIG. 4 and proceeds to step ST11 of that chart. Moreover, in cases where, during the interrupt processing, there is no shooting of new bullets and no hit processing is done, it would be acceptable to (have the flow) return to step ST101.

In step ST11 of FIG. 4, a replay demo screen is shown. Here, a graphic image demo is done. After that, it transitions to display of a "results evaluation" demo screen (step ST12). Here, an adjusting calculation of time is done, and the score of the player as a sniper is shown in the screen. The above "story mode" game (steps ST7–ST12) is repeated until the final stage (step ST13) is reached.

If it is the final stage (YES in step 13), it transitions to the ending demo screen (step ST14). Here, multiple (two or three types of) endings are provided. Alternatively, this step ST14 can be skipped. Next, "name entry" processing is done (step ST15). A ranking demo screen is displayed and the names of players are ranked in order of high score (step ST16). In this way, players can compete with others in terms of skill and many players can enjoy the game. In (step ST17) the "game over" screen is displayed and then the display returns to the above-indicated demo screen of step ST1.

In contrast, if "skill mode" is selected in above-indicated step ST6, the display changes to a demo screen explaining target quotas (step ST18). Then, the main processing for skill attack game begins (step ST19). This skill attack game main processing is basically the same as the above-indicated story mode game main processing, but its content requires of the player a higher level of skill. For example, the time given to the player may be shortened or movement of the enemy characters which are the targets may be speeded up, etc.

Here, if it is determined that the quota (success) has not been achieved (NO in step ST21), it will skip to step ST23 (which will be explained below) without waiting for the final stage. However if it is determined that the quota (success) has been achieved (YES in step ST21), it will repeat (step ST22) the above-indicated skill attack game main processing, etc. of steps ST18 to ST21 until the final stage is reached.

Also, when the final stage is reached, name entry processing is done (step ST23) and then, in succession, ranking demo screen is displayed (step ST24), "game over" screen is displayed (step ST25), and it returns to above-indicated demo screen of step ST1.

Note that this invention is not limited to the above-indicated embodiment, but the following changed forms can be adopted.

(1) The configuration of game apparatus main body 10 is such that game scenes are directly displayed on monitor 11 which is a CRT. However, it would be acceptable to change the CRT into an LCD, etc., or a configuration in which game scenes are projected onto a screen by a projector could be used. Likewise, model gun 20 need not be limited to a gun which shoots a series of bullets as a "burst" while the trigger is being pulled; a single-shot gun, which shoots one bullet each time the trigger is pulled, could also be used. Of course, a model gun which shoots a burst (or volley) of shots would be more suitable for near-hit processing than a single-shot gun. In addition, it would be acceptable to have the gun run out of bullets after a certain number of shots, to display a "magazine reload" scene, and to arrange that shots could not be fired during specified time period.

(2) In regard to enemy characters, the preferred embodiment performed both hit determination and near-hit determination, but it would also be possible to configure the game so that only near-hit determining was done. Even in that case, a game with a high level of interest could be created using the same characters and displaying the above-indicated various kinds of shooting results—such as having a flying character crash or be damaged, etc. after a certain pre-determined number of bullets had successively been "near hits." In contrast, considering the players, the preferred embodiment performed only hit determination, but both hit determination and near-hit determination could be done. In that case, the player can get a sense of the thrill of being a sniper, resulting in a game with an even higher level of interest.

(3) Enemy characters need not be limited to those displayed on land or in the air. For example, it would be acceptable to have characters that appear on water or underwater, etc. Objects moving on or through water can be treated in the same manner as flying objects. Also, it could be arranged that the player is riding in a vehicle or airplane and is sniping at enemy characters on the ground. In that case, a small degree of scene shaking could be introduced, as though the player were riding in a vehicle or airplane, and this would make sniping harder, increasing the level of game difficulty.

(4) The embodiment need not be limited to shooting-type video games for arcade use, but it could be applied to games for PC's, home game consoles, etc. When applied to PC's or home game consoles, the game can be implemented by inserting a memory medium on which is stored the program for displaying shooting results according to this invention, into the memory drive provided in the control part of the PC, home game console, etc.

(5) In the game, it can be arranged that for enemy characters, one (or some specified number) of boss characters, as well as a number of less skillful characters, appear. Information would be provided on each game character as to the number of bullets it could be hit with and still survive, and especially in the case of a boss character, it could not be knocked down until it had been hit with the specified number of bullets. This would also increase the play value of the game.

As explained above, in the video game apparatus of this invention, an image of a 3-dimensional game field including enemy characters is displayed by image display means 132a on monitor 11 and an enlarged image of the small area corresponding to the part of above-indicated image at which the model gun 20 is pointing is displayed by display means for enlarged images 132b in liquid crystal unit 22 of scope 23 which is mounted on model gun 20. As a result, the game becomes filled with more realism and the level of interest can be further increased.

Note that the method of this invention for displaying shooting results is embodied according to the operation of above-indicated shooting-type video game apparatus.

As mentioned above, in this invention, an image of a 3-dimensional game field including enemy characters is displayed on a monitor and an enlarged image of the small area corresponding to the part of above-indicated image at which the model gun is pointing is displayed by display device mounted on the model gun. As a result, the game becomes filled with more realism and the level of interest can be further increased.

Further, if a gun muzzle direction detecting means, which detects the direction in which the above-indicated model gun is pointed, is provided, then, when sniping at the enemy character, it can be accurately determined whether a hit has been made. As a result, the game becomes filled with more realism and the level of interest can be further increased.

In addition, an "anti-shaking" means can be provided. It establishes a "non-response zone" such that as long as the distance between the position in the game field which corresponds to the center of the enlarged image displayed in above-indicated display device and that of the enemy character is within a specified range, small movements in the direction in which above-indicated model gun is pointed are not reflected in the enlarged image. Specifically, by increasing the closeness of the scale points of the actual "metering angle" within the virtual space, as one approaches the character, the result is that, as one approaches that character it becomes harder for the enlarged scene to move, while as one moves farther from the character, it becomes easier for the enlarged scene to move. In addition, it would be acceptable to slow the speed at which the enlarged image follows changes in the game scene or to reduce the sensitivity of operation by adding an appropriate filter, etc. As a result, it would become easier to aim at the enemy character. In this way, by reducing any drop in sniping hit rate caused by hand movements when using the scope, the interest level of the game increases. Moreover, by making it possible to activate the above-indicated anti-shaking means, even only when above-indicated enemy character is in the game scene, the image becomes less sensitive to shaking which reduces any drop in sniping hit ratio due to small hand movements when using the scope. On the other hand, image sensitivity to shaking can be increased in cases when the scope is not used. In this way the level of interest of the game can be increased. In addition, the above-indicated anti-shaking means can be applied even beyond the shooting game application. For example, it can be used for processing images when distant objects are viewed through a telescope.

Further, if the enlarged image displayed in the above-indicated display device is made brighter than the image displayed on the above-indicated monitor screen, visibility when the scope is used can be improved.

Still further, if above-indicated display means for enlarged images is made so that it can be activated according to the calculated distance between above-indicated model gun and above-indicated enemy character, then the scope becomes activated for sniping from long distances. In this way, the player can enjoy a game rich in realism.

Still further, if a bullet display means is provided which, synchronized with pulling of above-indicated trigger of above-indicated model gun, displays the progress of the bullet in a prescribed direction through above-indicated enlarged image, because there is an enlarged display of the bullet also, the player can enjoy a game rich in realism.

Further, if a hit-determining means which determines whether above-indicated enemy character has been hit by above-indicated bullet and a hit processing means which, when that hit-determining means determines that there has been a hit, displays at least in the image of above-indicated game field the fact the sniping has been successful are provided, the game becomes filled with realism and the level of interest is increased.

In addition, if a character information memory means that stores information which represents characteristics of enemy characters is provided and if the arrangement is that above-indicated hit-determining means makes above-indicated hit determinations in response to this character information, determinations will vary according to the character. As a result, the game will be rich in variations and the level of interest will be increased.

In addition, if above-indicated character information is the above-indicated "number of bullet shots which a game character can bear" then, by changing this number of bullet shots which a game character can bear according to whether a character is a boss or a less skillful character, above-indicated hit determination will be different for boss characters versus less skillful characters. As a result, the game will be rich in variations and the level of interest will be increased.

In addition, if above-indicated character information is data on the body parts of above-indicated enemy characters, determination of damage will be different, depending on whether, for example, the bullet hit the character's limbs or whether it hit his head. As a result, the game will be rich in realism and the level of interest will be increased.

Further, if above-indicated hit-determining means is equipped with a replay scene display means that makes it possible to display in one part of above-indicated monitor means a replay of a scene of success in sniping at above-indicated enemy character, one can check the scene of the moment of sniping success. Also, utilizing this replay screen, others watching (besides the player) will also avoid missing the sniping scene.

Still further, when it has been determined by above-indicated hit-determining means that a shot is not a hit, if a near-hit determining means is provided which determines whether a hit is in the region near above-indicated enemy character, then when this near-hit determining means determines that a near-hit has occurred, above-indicated enemy character can be made to perform an action indicating that he has noticed the sniping. In this way the player, who is the sniper, can experience the thrill, just as though he and his sniping had actually been discovered.

Further, if a counterattack processing means is provided which, when a near-hit is determined by above-indicated near-hit determining means, causes above-indicated enemy character to take action such as pointing his muzzle at the player and shooting, the player, who is the sniper, can experience the thrill, just as though he is actually being sniped at.

Further, if a means for displaying (the player's) being shot is provided, then when above-indicated counterattack processing means is activated, the situation of being sniped at is displayed in above-indicated enlarged image. As a result, the game will be rich in realism and the level of interest will be increased.

Further, by providing a player information memory means which stores player information, where above-indicated player information is an index which allows continuation of the player's play, and a play continuation index calculation means which reduces this index by a certain amount each time sniping is done, the player, who is the sniper, can experience a sense of thrill.

In addition, by providing a player information memory means which stores player information, where above-indicated player information is an index which allows continuation of the player's play, and a play continuation index calculation means which reduces this index by a certain amount each time the player is hit, the player, who is the sniper, can experience a sense of thrill.

INDUSTRIAL APPLICABILITY

This invention, by making shooting-type games richer in realism, can increase the level of interest and provide a higher level of game content.

What is claimed is:

1. A shooting-type video game apparatus in which enemy characters displayed on a monitor are shot at with a model gun comprising:

image display means for displaying on the monitor a 3-dimensional game field image which includes enemy characters;

a display device included in the model gun;

bullet display means for displaying the progress of bullets fired in succession during a time the trigger is pulled; and enlarged image display means for enlarged display of a small area corresponding to a portion of said image at which said model gun is pointed on said display device, said enlarged image display means being activatable in response to the calculated distance between said model gun and said enemy character.

2. A shooting-type video game apparatus according to claim 1, further comprising muzzle direction detecting means for detecting the direction of the model gun.

3. The shooting-type video game apparatus according to claim 1, wherein the enlarged image displayed in said display device is brighter than the image displayed on the monitor.

4. The shooting-type video game apparatus according to claim 1 wherein said bullet display means for displays the progress of bullets in synchronization with pulling of said trigger of said model gun.

5. The shooting-type video game apparatus according to claim 4, characterized by further comprising hit-determining means for determining whether said enemy character has been hit by said bullets, and hit processing means for displaying, at least in said game field image, the fact that the sniping was successful in the event that the hit-determining means determines that a hit has been made.

6. The shooting-type video game apparatus according to claim 5, further comprising character information memory means for storing character information representing the characteristics of enemy characters, wherein said hit-determining means performs said determination according to this character information.

7. The shooting-type video game apparatus according to claim 6, wherein said character information is the number of bullet shots which above-indicated character can bear.

8. The shooting-type video game apparatus according to claim 6, wherein said character information is data on the parts of said enemy characters.

9. The shooting-type video game apparatus according to claim 5, further comprising replay scene display means for enabling said hit processing means to display, in a part of said monitor screen, a replay of the image of the moment of sniping success against said enemy character.

10. The shooting-type video game apparatus according to claim 5, further comprising near-hit determining means for determining, in the event that said hit-determining means determines that there has not been a hit, whether there has been a near-hit of said enemy character, wherein the near-hit determining means, in the event that it determines that there has been a near-hit, causes said enemy character to take action indicating recognition that he is being sniped at.

11. The shooting-type video game apparatus according to claim 5, further comprising counterattack processing means for causing said enemy character to point its gun muzzle in the direction of the player and counterattack in the event that said near-hit determining means determines that there has been a near-hit.

12. The shooting-type video game apparatus according to claim 11, further comprising shot-at display means for displaying in said enlarged image the situation of being shot at, during the time that said counterattack processing means is activated.

13. The shooting-type video game apparatus according to claim 12, further comprising:

player information memory means for storing player information, said player information being an index which enables player's play to continue; and play continuation index calculating means for reducing this index by a specified amount with each sniping shot.

14. The shooting-type video game apparatus according to claim 12, further comprising:

player information memory means for storing player information, said player information being an index which enables player's play to continue; and play continuation index calculating means for reducing this index by a specified amount each time that the player is shot at or hit.

15. The shooting-type video game apparatus in which enemy characters displayed on a monitor are shot at with a model gun comprising:

image display means for displaying on the monitor a 3-dimensional game field image which includes enemy characters;

a display device included in the model gun;

enlarged image display means for enlarged display of a small area corresponding to a portion of said image at which said model gun is pointed on said display device;

bullet display means for displaying progress of bullets fired in succession during a time the trigger is pulled; and shake preventing means having a non-responsive zone wherein small movements in the direction in which the model gun is pointed are not reflected in said enlarged image when the distance between a position in the game field corresponding to the center of the enlarged image displayed in said display device and the position of the enemy character lies within a predetermined range.

16. A method for displaying sniping results for a shooting-type video game apparatus in which enemy characters displayed on a monitor screen are shot at with a model gun, comprising the step of:

displaying on said monitor a 3-dimensional game field image which includes enemy characters;

displaying on a display device included in said model gun an enlarged image of a small area corresponding to a portion of said image at which said model gun is pointed in response to a calculated distance between said model gun and said enemy character; and displaying the progress- of bullets fired in succession during a time the trigger is pulled.

17. A shooting-type video game apparatus in which enemy characters displayed on a monitor are shot at with a model gun, comprising:

image display means for displaying on the monitor a 3-dimensional game field image which includes enemy characters;

a display device included in the model gun;

enlarged image display means for enlarged display of a small area corresponding to the portion of said image at which said model gun is pointed on said display device;

shake preventing means having a non-responsive zone wherein small movements in the direction in which the model gun is pointed are not reflected in said enlarged image when a distance between a position in the game field corresponding to a center of the enlarged image displayed in said display device and a position of the enemy character lies within a predetermined range;

counterattack processing means for causing said enemy character to point its gun muzzle in a direction of the player; and shot-at display means for displaying in said enlarged image the situation of player being shot at during a time that said counterattack processing means is activated.

\* \* \* \* \*